(12) United States Patent
Kobayashi

(10) Patent No.: US 8,109,851 B2
(45) Date of Patent: Feb. 7, 2012

(54) DRIVING BELT AND METHOD FOR ASSEMBLING SAME

(75) Inventor: Daisuke Kobayashi, Mishima (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 336 days.

(21) Appl. No.: 12/439,173

(22) PCT Filed: Aug. 22, 2007

(86) PCT No.: PCT/JP2007/066694
§ 371 (c)(1),
(2), (4) Date: Feb. 27, 2009

(87) PCT Pub. No.: WO2008/026609
PCT Pub. Date: Mar. 6, 2008

(65) Prior Publication Data
US 2010/0016112 A1    Jan. 21, 2010

(30) Foreign Application Priority Data
Aug. 28, 2006  (JP) .................................. 2006-231270

(51) Int. Cl.
*F16G 5/16*    (2006.01)
(52) U.S. Cl. ........................................ 474/201; 474/242
(58) Field of Classification Search ................... 474/201, 474/237, 240, 242, 244, 245, 246, 255
See application file for complete search history.

(56) References Cited

U.S. PATENT DOCUMENTS

| 4,645,478 A | 2/1987 | Cuypers |
| 4,894,049 A | 1/1990 | Koppelaars |
| 6,679,798 B1 | 1/2004 | Takagi et al. |
| 7,070,529 B2 * | 7/2006 | Tsuji et al. .................. 474/242 |

FOREIGN PATENT DOCUMENTS

| EP | 0 151 396 B1 | 10/1986 |
| EP | 1 132 649 A1 | 9/2001 |
| JP | 58 9547 | 1/1983 |
| JP | 58 109748 | 6/1983 |
| JP | 60 69346 | 4/1985 |
| JP | 2000 205342 | 7/2000 |
| JP | 2000 249195 | 9/2000 |
| JP | 2001 193796 | 7/2001 |
| JP | 2002 276740 | 9/2002 |
| JP | 2004-066434 | 3/2004 |
| RU | 1459614 A3 | 2/1989 |
| RU | 1782298 A3 | 12/1992 |

OTHER PUBLICATIONS

Machine Translation of JP 2000-205342.*

(Continued)

*Primary Examiner* — William E Dondero
(74) *Attorney, Agent, or Firm* — Oblon, Spivak, McClelland, Maier & Neustadt, L.L.P.

(57) ABSTRACT

A driving belt and method of assembling the same, which can fit rings with elements easily even at a final phase of fitting work. In a driving belt, two rows of endless rings are accommodated and held parallel to each other in a recess of a plurality of elements interlinked annularly in a manner to situate the recess to open to an outer circumferential side and in a manner to pivot with respect to the adjoining elements, and the element includes plural types of elements having different configurations of the recess.

20 Claims, 8 Drawing Sheets

OTHER PUBLICATIONS

Extended Search Report issued Dec. 3, 2010 in EP Application No. 07806171.0.
U.S. Appl. No. 12/438,739, filed Feb. 25, 2009, Kobayashi.
U.S. Appl. No. 12/439,175, filed Feb. 27, 2009, Kobayashi.
U.S. Appl. No. 12/439,014, filed Feb. 26, 2009, Kobayashi.
U.S. Appl. No. 12/439,172, filed Feb. 27, 2009, Kobayashi.

* cited by examiner

DRIVING BELT AND METHOD FOR ASSEMBLING SAME

TECHNICAL FIELD

This invention relates to a driving belt, in which a plurality of plate elements interlinked with one another in a circular manner is fastened by an endless annular ring, and to an assembling method thereof.

BACKGROUND ART

In the prior art, a geared transmission capable of changing a gear stage thereof stepwise, and a continuously variable transmission capable of varying a speed change ratio steplessly are available as a transmission mechanism for transmitting power between rotary members. For example, a belt-type continuously variable transmission and a toroidal-type continuously variable transmission are known as the continuously variable transmission. Specifically, the belt-type continuously variable transmission is a transmission varying a speed change ratio continuously using a pair of drive pulleys and a pair of driven pulleys, and a driving belt applied to those pulleys. The known endless driving belt used in such belt-type continuously variable transmission is prepared by arranging a plurality of plate members called an "element" or a "block" in a circular manner while connecting the plate members with one another, and fastening the interlinked plate members by an annular belt called a "band" or a "carrier".

When the driving belt of this kind applied to the drive and driven pulleys is driven by driving the drive pulley, a frictional force acts on a contact portion between the element and the drive pulley, and a compressive force is applied to the elements in the arranging direction thereof, i.e., in the thickness direction thereof according to a torque of the drive pulley. The compressive force applied to the element being contacted with the drive pulley is transmitted to the element being contacted with the driven pulley via the elements existing between the drive and driven pulleys. When the compressive force is transmitted to the element being contacted with the driven pulley, a frictional force is generated at the contact portion between the element and the driven pulley, and a torque to rotate the driven pulley is established according to the transmitted compressive force. The power is thus transmitted between the drive and driven pulley through the driving belt.

One example of above-explained driving belt is disclosed in Japanese Patent Laid-Open No. 2000-249195. The "High-Loaded Transmission Belt" taught by Japanese Patent Laid-Open No. 2000-249195 is composed of a center belt and blocks reinforced against lateral pressure, and it is applied to a main prime mover and an auxiliary prime mover of automobiles and agricultural machineries. Specifically, the "High-Loaded Transmission Belt" comprises a block (i.e., an element) which is so constituted that two belt sides having lock parts in its top end are connected to each other in their bottom ends by a connecting member, and two rows of endless carriers (i.e., rings) fixedly fitted into an engagement groove opening between the lock parts. The belt side portion of the element is provided individually with a convex portion and a concave portion on each face so that the elements can interlink with one another. Therefore, the interlinked elements can be aligned even when the belt is running.

In addition to above, Japanese Patent Laid-Open No. 2001-193796 discloses an invention relating to "Element for Metal Belt and Metal Belt" for continuously variable transmissions of vehicles. The metal belt taught by Japanese Patent Laid-Open No. 2001-193796 comprises: a metal endless band (i.e., a ring) applied to annular grooves of a drive and a driven pulleys; a plurality of metal element composed of a body portion to be contacted with the annular groove of the pulley, a pair of pillars erected on the body portion and faced with each other, an engagement protruded portion formed on a leading end of the pillar, and an opening for inserting the band (i.e., a recessed portion) formed between the engagement protruded portions; and an endless metal falling preventing body somewhat wider than the band. The falling preventing body can be bent to narrow its width when it is inserted in between the engagement protruded portions to prevent falling of the band.

According to the transmission belt taught by Japanese Patent Laid-Open No. 2000-249195, the lock parts are formed on both belt sides of the element erected beside the carriers to hold the carriers on the element, and the convex portion and the concave portion are formed individually on an upper corner of each face of the belt sides to interlink adjoining elements. That is, the convex portion and concave portion functioning as male and female connections are formed symmetrically on both upper corner of the element. The carriers are individually fitted into each engagement groove and held by the lock part so that two rows of the belts are held in the element.

According to the transmission belt of Japanese Patent Laid-Open No. 2000-249195 thus structured, the carriers arranged parallel to each other have to be overlapped partially when fitted onto the elements or dismounted from the elements. That is, a total width of the carriers arranged parallel to each other have to be reduced narrower than the opening width between the lock parts of the element when the carriers are fitted onto the elements or dismounted from the elements, by twisting the carriers to overlap partially.

In order to twist the carriers being arranged parallel to each other thereby overlapping those carriers partially, it is necessary to swing the interlinked elements, that is, to pivot the elements relatively with each other. However, according to the transmission belt taught by Japanese Patent Laid-Open No. 2000-249195, the convex portion and the concave portion for interlinking adjoining elements are formed on both upper corners of the element. Accordingly, lateral movement of the element has to be restricted. This makes difficult to overlap the carriers arranged parallel to each other when assembling the transmission belt.

In order to solve the above-mentioned problem, the applicant has filed an application relating to the driving belt, in which a male connection and a female connection for joining adjoining elements are individually formed on each face of the element being opposed to the adjoining element at a width center of the element. Therefore, each element can pivot relatively with the adjoining elements so that the two rows of rings aligned parallel to each other can be overlapped partially when fitted with the elements. However, the pivotal movement of the element is eventually restricted especially at a final phase of such fitting operation of the rings and the elements, for example, at a stage when fitting a last piece or last several pieces of the interlinked element with the rings. Thus, the last piece or last several pieces of the interlinked element is difficult to be fitted with the rings. That is, further modification of the element is still required to improve easiness in assembly of the driving belt.

DISCLOSURE OF THE INVENTION

The present invention has been conceived noting the technical problems thus far described, and its object is to provide a driving belt which can be assembled easily, specifically, in which rings can be fitted easily into a recess of the element even at a final phase of a fitting work, and an assembling method thereof.

In order to achieve the above-mentioned object, according to the present invention, there is provided a driving belt, in which a plurality of elements is interlinked annularly in a manner to situate a recess thereof to open to an outer circumferential side and in a manner to pivot with respect to the adjoining elements, and in which two rows of endless rings are accommodated parallel to each other in the recess of the element, characterized in that: the elements include plural types of elements having different configurations of the recess.

The element includes different types of elements, in which a distance between an inner lateral face of one of the rings and one of end faces of an opening of the recess opposed thereto is different, provided that an outer lateral face of said one of the rings is contacted to one of inner walls of the recess opposed to said one of the end faces of the opening of the recess.

More specifically, the element include two types of elements such as a first element in which the above-mentioned distance is narrower than a width of the other ring, and a second element in which the above-mentioned distance is wider than the width of the other ring.

An opening width of the recess of the element is narrower than a total width of the two rows of rings, and a width of a bottom side of the recess is wider than the total width of the two rows of rings.

In addition to above, the element comprises a male connection protruding toward an adjoining element on one of the faces thereof being opposed to the adjoining element, and a female connection into which the male connection is fitted loosely on a face opposite to the face where the male connection is formed. That is, each of the elements is interlinked pivotally with both of the adjoining elements through the male and female connections.

According to the invention, the male connection and the female connection are respectively formed at one spot of the face where the male connection and the female connection are respectively formed.

Specifically, the male and female connections are respectively formed on a width center of the face where the male and female connections are respectively formed.

In addition to above, the element comprises protruding portions for holding the rings to prevent detachment of the rings. The protruding portions protrude toward a width center of the element from outer circumferential side of inner walls of the recess, and a clearance between the protruding portions is narrower than the total width of the two rows of rings.

In addition to above, each of the rings comprises an outer layer, which is laid on an outer face thereof in the recess, and which is disposed between the protruding portions.

According to another aspect of the invention, there is provided an assembling method of a driving belt, in which a plurality of elements is interlinked annularly in a manner to situate a recess thereof to open to an outer circumferential side and in a manner to pivot with respect to the adjoining elements, in which two rows of endless rings are accommodated parallel to each other in the recess of the element, and in which the plurality of elements include a first element and a second element having different configurations of the recesses, comprising: fitting the two rows of rings into the recess of the first element except for the last piece or the last predetermined pieces of the scheduled quantity of the elements; and thereafter fitting a remaining portion of the two rows of rings into the recess of the second element for the last piece or the last predetermined pieces of the element.

More specifically, the remaining portion of the two rows of rings is fitted into the recess of the second element while pushing the outer lateral face of one of the rings onto one of the inner walls of the recess, and thereafter moving the second element in a width direction thereof to a predetermined portion to hold the two rows of rings.

In addition to above, the assembling method of a driving belt of the invention further comprising: twisting the two rows of rings to overlap the rings partially while keeping remaining portion of the rings parallel to each other; fitting the overlapped portion of the two rows of rings into the recess of the first element; and thereafter moving the first element to the portion where the rings are kept parallel to each other to accommodate the rings aligned parallel to each other in the recess.

A width of the overlapped portion of the two rows of the rings is narrowed narrower than an opening width of the recess, and on the other hand, a total width of the remaining portion of the rings aligned parallel to each other is kept wider than the opening width of the recess of the first element but narrower than a bottom width of the recess of the first element.

In addition to above, according to the assembling method of the invention, the two rows of rings aligned parallel to each other is overlapped partially by a pivotal movement of the first element accommodating the rings in its recess with respect to the adjoining elements.

According to the invention, the plurality of elements fastened by the two rows of the endless rings thus includes different types of the elements having a different configuration of the recess for accommodating the rings aligned parallel to each other. That is, the element can be selected arbitrarily according to a fitting condition of the elements and the rings or a fitting phase of the rings into the recess of the elements. Therefore, the rings can be fitted into the recess of the element easily, and an easiness of assembly of the driving belt is thereby improved.

Specifically, the elements include different types of the elements having a different configuration of the recess in which a distance between an inner lateral face of one of the rings and one of end faces of an opening of the recess opposed thereto is different, provided that an outer lateral face of said one of the rings is contacted to one of inner walls of the recess opposed to said one of the end faces of the opening of the recess. Therefore, the element can be selected arbitrarily from different types of elements in which the above-explained distance is different, depending on a fitting condition of the elements and the rings or a fitting phase of the rings into the recess of the elements. As a result, the rings can be fitted into the recess of the element easily, and an easiness of assembly of the driving belt is thereby improved.

More specifically, the elements include two kinds of elements such as the first element and the second element. As explained above, in the first element, the distance between the inner lateral face of one of the rings and one of the end faces of the opening of the recess opposed thereto is narrower than the width of the other ring when the outer lateral face of said one of the rings is contacted to one of inner walls of the recess opposed to said one of the end faces of the opening of the recess. To the contrary, in the second element, the distance between the inner lateral face of one of the rings and one of the end faces of the opening of the recess opposed thereto is wider than the width of the other ring when the outer lateral face of said one of the rings is contacted to one of inner walls of the recess opposed to said one of the end faces of the opening of the recess. Therefore, the element can be selected arbitrarily from different types of elements in which the above-explained distance is different, depending on a fitting condition of the elements and the rings or a fitting phase of the rings into the recess of the elements. For example, the first element is used in the initial phase of fitting the rings into the recesses of scheduled number of the elements, and the second element is used in the final phase. For this reason, the rings can be fitted into the recess of the element easily even at the final phase of fitting the rings into the recess of the element. As a result, an easiness of assembly of the driving belt is improved.

According to the invention, the opening width of the recess of the element, i.e., a distance between the end faces of the protruding portions is narrower than the total width of the two rows of rings, and the bottom width of the recess is wider than the total width of the two rows of rings. Therefore, the rings can be fitted easily into the recess of the element, and the elements are thereby fastened certainly by the rings. Consequently, the rings will not be detached from the recess of the element.

In addition to the above advantage, as explained above, the male and female connections are formed individually on each face of the element being opposed to an adjoining element, and the elements are interlinked by joining the male and female connections while keeping a predetermined clearance. Therefore, the elements interlinked in a circular manner can be positioned accurately, and the elements can pivot relatively with each other.

Specifically, the male and female connections are respectively formed at one spot of the face where the male connection and female connections are respectively formed. Therefore, the elements interlinked in a circular manner can be positioned accurately, and the elements can pivot easily around the connected male and female connections.

More specifically, both of the male connection and female connection respectively formed on each face of the element being opposed to the adjoining element are situated on a substantially intermediate portion of the element in the width direction. Therefore, the elements interlinked in a circular manner can be positioned accurately, and the each element is allowed to pivot equally in the width direction thereof around the joined male and female connections situated on the width center thereof.

In addition to above advantage, the opening width of the recess, that is, the distance between the end faces of the protruding portions protruding toward the width center of the element from the outer circumferential side of the inner walls of the recess is narrower than the total width of the two rows of rings. Therefore, the rings can be held certainly in the recess and detachment of the rings from the elements is thereby prevented.

In addition to the above advantage, according to the invention, an outer layer can be formed between the protruding portions on the outer face of each ring accommodated in the recess of the element. Therefore, a thickness of the ring can be increased to enhance the strength of the driving belt while utilizing the space between the protruding portions efficiently.

According to the assembling method of the invention, first of all, the two rows of rings are fitted into the recess of the predetermined pieces of the first elements, and then, the remaining portion of the rings is fitted into the recess of one or predetermined piece(s) of the second element(s) at the final phase to complete the fitting work of the rings into the recess of the elements. Thus, the element can be selected arbitrarily from two different types such as the first element and the second element depending on a fitting condition of the elements and the rings or a fitting phase of the rings into the recess of the elements. As a result, the rings can be fitted into the recess of the element easily, and an easiness of assembly of the driving belt is thereby improved.

At the final phase of the fitting work, the remaining portion of the two rows of rings is fitted into the recess of the second element(s) while pushing the outer lateral face of one of the rings onto one of the inner walls of the recess. Then, the second element is moved in its width direction to a predetermined portion to accommodate the two rows of the rings. In other words, the second element is moved laterally to align the width center thereof with the width center of the two rows of rings to hold the two rows of rings. Therefore, the remaining portion of the two rows of rings can be fitted easily into the recess of the second element or recesses of the last predetermined pieces of the second elements at the final phase of the fitting work, while being aligned parallel to each other without being overlapped. Thus, an easiness of assembly of the driving belt is improved.

According to the assembling method of the invention, the two rows of rings aligned parallel to each other are twisted to be overlapped partially when fitted into the recess of the first element. The overlapped portion of the rings, in other words, the narrowed portion of the rings is fitted into the recess of the first element, and then, the first element accommodating the rings in its recess is moved in the length direction of the rings to the portion where the rings are aligned parallel to each other. As a result, the two rows of rings are held properly in the recess of the first element. Thus, the two rows of rings can be fitted into the recess of the first element easily. As a result, an easiness of assembly of the driving belt is improved.

In addition to the above advantage, according to the assembling method of the invention, the total width of the overlapped portion of the two rows of rings is narrowed narrower than the opening width of the recess of the first element. On the other hand, the total width of the rings at the portion where the rings are aligned parallel to each other is wider than the opening width of the recess of the first element but narrower than the bottom width of the recess. Therefore, the overlapped portion of the two rows of rings can be fitted into the recess of the first element easily from the opening of the recess to the bottom of the recess. The first element accommodating the overlapped portion of the rings in its recess is thereafter moved in the length direction of the rings to the portion where the rings are aligned parallel to each other. As a result, the two rows of rings can be accommodated easily in the recess of the first element while being aligned parallel to each other. Therefore, an easiness of assembly of the driving belt can be improved.

Further, according to the invention, when fitting the two rows of rings into the recess of the first element sequentially, the portions of the rings which have already been accommodated in the recess of the element while being aligned parallel to each other can be twisted by a pivotal movement of the first element accommodating the rings in the recess thereof. As a result, the rings held in the recess of the first element are overlapped partially. Therefore, the remaining portion of the rings to be accommodated in the recess of the element can be fitted into the recess of the element easily and sequentially. Therefore, an easiness of assembly of the driving belt can be improved.

BEST MODE FOR CARRYING OUT THE INVENTION

Next, this invention will be explained with reference to the accompanying drawings. First of all, first to second examples will be explained sequentially, and then, an assembling method of the driving belt of the invention will be explained.

FIRST EXAMPLE

Figure 1:
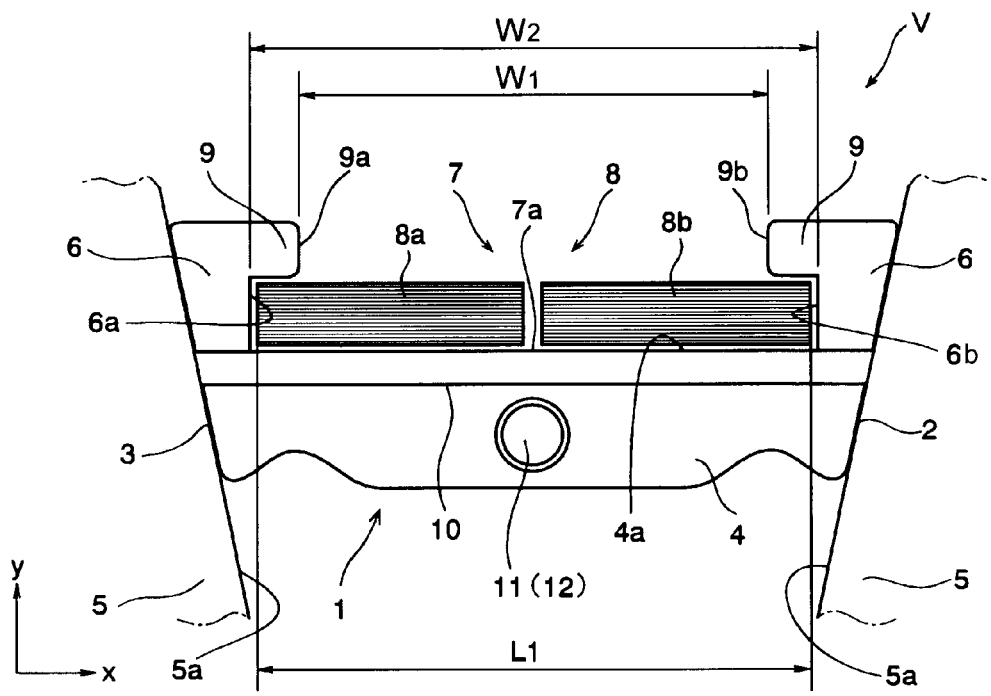
FIG. 1 is a front view schematically showing a configuration of the first element used in a first example of the driving belt of the invention.

Here will be explained configurations of elements and rings constituting a driving belt V of the first example with reference to FIGS. 1 and 3. FIG. 1 shows an example of a driving belt V to be applied to a drive pulley (i.e., an input shaft side pulley) and a driven pulley (i.e., an output shaft side pulley) of a belt type continuously variable transmission so as to transmit a power between those pulleys. An element 1 includes two kinds of elements such as a first element 1a and a second element 1b. In this connection, the first element 1a mainly used in the driving belt V will be explained first of all.

The element 1a is a metal plate member comprising a base portion (or main body) 4. Both lateral faces 2 and 3 of the base portion 4, that is, both lateral ends (in the direction of x-axis in FIG. 1) of the base portion 4 are inclined. The inclined lateral faces 2 and 3 are frictionally contacted with a V-shaped groove of a drive or driven pulley 5 of the belt type continuously variable transmission to transmit a torque.

The base portion 4 comprises columns 6 erected vertically (in the direction of y-axis in FIGS. 1 and 2) at both lateral ends (in the direction of x-axis in FIG. 1) thereof. Accordingly, a recess 7 is formed by an upper face (or a top edge) 4a of the base portion 4 and both inner walls 6a and 6b of the columns 6 facing to the width center of the base portion 4. Thus, the recess 7 opens upwardly, in other words, the recess 7 opens toward an outer circumference of the driving belt V.

Specifically, the recess 7 is a space for accommodating an endless ring 8 for fastening the elements 1 interlinked closely with one another in a circular manner. That is, the upper face 4a functions as a saddle face 4a onto which an inner circumferential face of the ring 8 is fitted.

The ring 8 is a layered ring made of metal comprising a plurality of annular belt-like layers overlapped in a circumferential direction. According to the first example, two rings 8a and 8b are arranged parallel to each other in the recess 7. Here, a configuration, dimensions, material, strength and so on of the rings 8a and 8b are identical to each other.

The element 1 comprises protruding portions 9. Each protruding portion 9 is formed integrally with the column 6 and protrudes toward a width center of the base portion 4 from an outer circumferential side of the columns 6, that is, both end faces 9a and 9b of the protruding portions 9 are faced inwardly to be opposed to each other. In other words, the protruding portion 9 is formed on both opening ends of the recess 7 above lateral ends of the ring 8a and 8b, i.e., on the end portions of the inner walls 6a and 6b, and both of the protruding portions 9 protrude toward the width center of the recess 7 (i.e., in the direction of x-axis in FIG. 1). Thus, a distance between the end faces 9a and 9b being opposed to each other is an opening width of the recess 7, and such distance between the end faces 9a and 9b is represented by W1 in FIG. 1. On the other hand, a width W2 at a bottom portion 7a of the recess 7, that is, a distance between the inner walls 6a and 6b is wider than the opening width W1, as shown in FIG. 1.

The elements 1 are interlinked with one another in a circular manner and fastened by the ring 8. The elements 1 thus fastened by the ring 8 is applied to the drive and driven pulleys 5. In case the driving belt V is applied to the pulleys 5, clearances between the elements 1 are narrowed gradually toward a rotational center of the pulleys 5 in a region where the elements 1 are contacted with the pulleys 5, and the elements 1 are eventually contacted with one another at its portion close to the rotational center of the pulley 5. For this reason, a thickness of the element 1 has to be thinned at its lower portion, that is, at the portion close to the rotational center of the pulley 5, as illustrated in FIG. 2.

Figure 2:
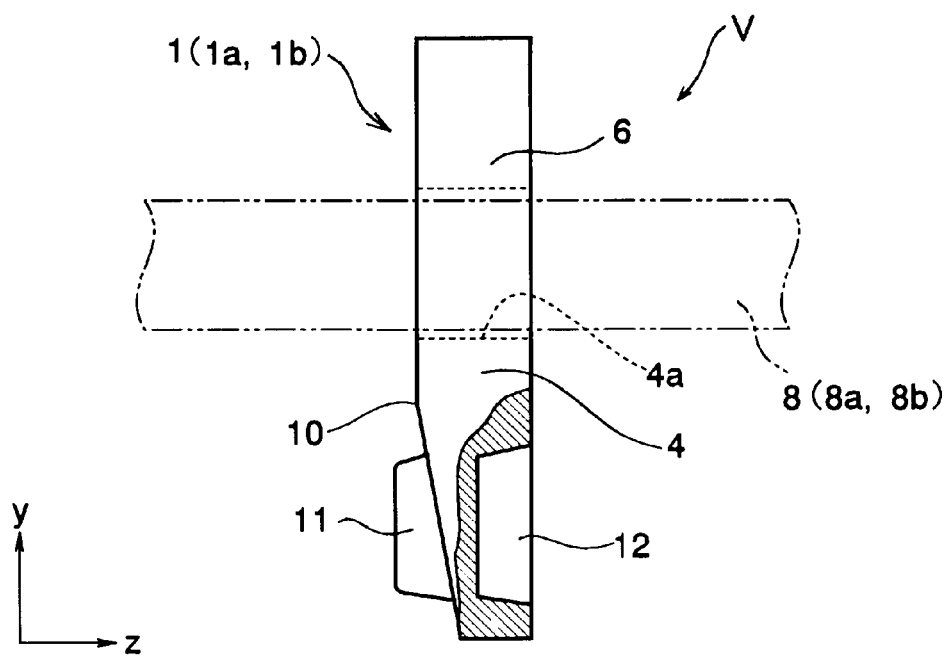
FIG. 2 is a side sectional view schematically showing a section of the driving belt of the first example.

According to the example shown in FIG. 2, one of the faces of the base portion 4 i.e., the left face in FIG. 2 is thinned gradually from a predetermined portion below the saddle face 4a. In case the belt V is being applied to the pulleys 5, the elements 1 are contacted with the adjoining element 1 at the portion where the thickness thereof is gradually reduced, in the region where the elements 1 are contacted with the pulley 5, in other words, in a curving region of the belt V. That is, an edge of a boundary of thickness functions as a rocking edge 10.

A male connection 11 and a female connection 12 are respectively formed on each face of the base portion 4 being opposed to the adjoining element, at the center of width of the element 1a. Specifically, as shown in FIG. 2, the male connection 11 of circular truncated cone is formed on one of the faces of the base portion 4 where the rocking edge 10 is formed. On the other hand, the bottomed cylindrical female connection 12 to which the adjoining male connection 11 is inserted loosely is formed on a face opposite to the face on which the male connection 11 is formed. Therefore, the elements 1 can be kept in line within a straight region of the belt V where the element 1 is not being contacted with the pulley 5.

That is, a relative position of the elements 1 within the straight region of the driving belt V can be determined in both vertical and horizontal directions in FIG. 1 by joining the male and female connections 11 and 12. For this reason, chattering of the driving belt V is prevented so that the belt V can be driven smoothly when the belt-type continuously variable transmission is driven.

As explained above, a main objective of the present invention is to simplify the assembly of the elements 1 and the ring 8 of the driving belt V. For this purpose, the recess 7 is formed on the outer circumferential side of the element 1, and the protruding portions 9 protruding toward the width center of the recess 7 are formed on the outer circumferential side of both of the inner walls 6a and 6b of the columns 6. Also, the male connection 11 protruding toward the adjoining element is formed on one of the faces of the element 1 being opposed to the adjoining element 1, and the female connection 12 into which the male connection is inserted loosely is formed on the face of the element 1 opposite to the face on which the male connection 11 is formed. More specifically, the male connection 11 and the female connection 12 are respectively formed at one spot of the face where the male and female connections 11 and 12 are respectively formed, at the center of width of the element 1.

Figure 3:
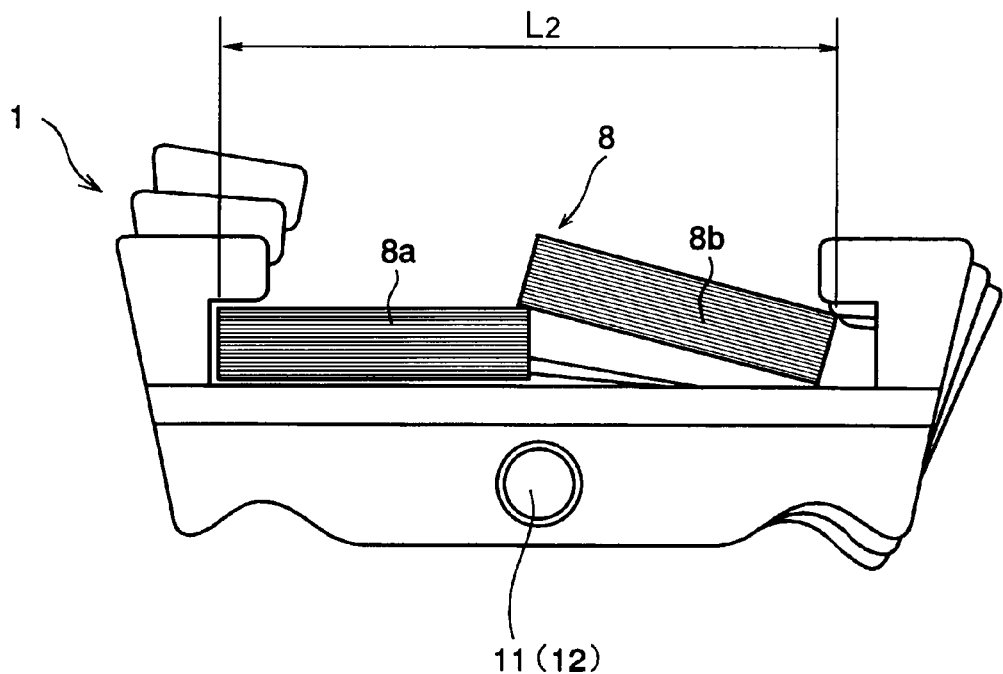
FIG. 3 is a view schematically showing a pivotal movement of the elements constituting the driving belt of the first example.

Since only one male connection 11 and one female connection 12 are respectively formed on each face of the element 1 at the width center of the element 1, and those male and female connections 11 and 12 are individually joined with the adjoining male or female connection 11 or 12, the elements 1 interlinked in a circular manner can swing relatively with each other, in other words, the interlinked elements 1 can pivot relatively with each other, as shown in FIG. 3.

Figure 4:
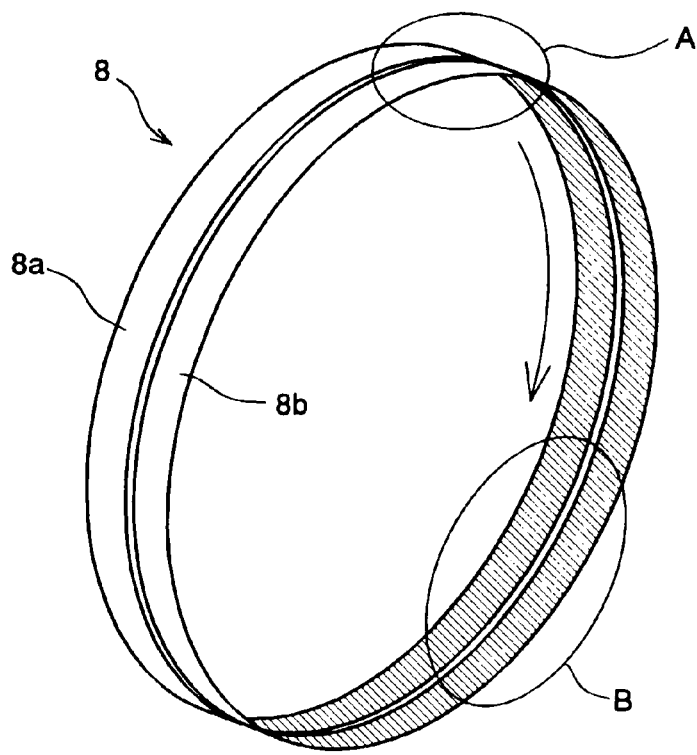
FIG. 4 is a view schematically showing an overlapped portion of the rings and a remaining portion of the rings aligned parallel to each other.

As mentioned above, the ring 8 comprises two rings 8a and 8b in this example. Therefore, as shown in FIG. 4, the rings 8a and 8b can be overlapped partially (as shown in a circle A in FIG. 4) while keeping the remaining portion of the rings 8a and 8b parallel to each other (as shown in a circle B in FIG. 4).

According to the conventional driving belt, high degree of freedom of rings aligned parallel to each other is still ensured at an initial stage in which a number of the elements holding those rings is relatively small so that those rings can be twisted easily to be overlapped partially. However, as the number of the element holding those rings increases, for example, at a stage in which more than half round of the rings are held by the elements, a twisting movement of the rings has to be restricted. On the other hand, according to the invention, the elements 1 of the driving belt V are interlinked to the adjoining elements 1 in a circular manner being pivotable relative to each other. Therefore, the ring 8 can be twisted easily to be overlapped partially by a pivotal movement of the element 1 even at a stage in which relatively large number of elements 1 are holding the rings 8a and 8b.

As shown in FIG. 1, a width L1 of the ring 8, i.e., a total width of the rings 8a and 8b aligned parallel to each other is wider than the aforementioned opening width W1 but narrower than the width W2. However, as indicated by L2 in FIG. 3, the total width of the ring 8 can be reduced partially narrower than the opening width W1 by overlapping the rings 8a and 8b partially.

More specifically, according to the first element 1a and the ring 8 of the invention, the opening width W1 of the recess 7 is narrower than the width L1 of the ring 8, and the width W2 of the recess 7 is wider than the width L1 of the ring 8. In other words, the width L2 of the overlapped rings 8a and 8b is narrower than the opening width W1 of the recess 7, and the width L1 of the rings 8a and 8b aligned parallel to each other is wider than the opening width W1 of the recess 7 but narrower than the width W2 of the recess 7.

Therefore, the ring 8 can be fitted into the recess 7 from the overlapped portion of the rings 8a and 8b through the clearance between the end faces 9a and 9b. After the overlapped portion of the rings 8a and 8b is thus fitted into the recess 7 from the clearance between the end faces 9a and 9b, the first element 1a holding the overlapped portion of the rings 8a and 8b in its recess 7 is moved to the portion where the rings 8a and 8b are aligned parallel to each other so that the rings 8a and 8b can be accommodated in the recess 7 firmly while being aligned parallel to each other. Alternatively, it is also possible to align the partially overlapped rings 8a and 8b parallel to each other again in the recess 7. As a result, the rings 8a and 8b can be held in the recess 7 while being aligned parallel to each other, and disengagement of the ring 8 from the element 1 is thereby prevented. Thus, according to the invention, the ring 8 can be accommodated in the recess 7 of the element 1 easily and certainly.

As described above, the first element 1a is used from the beginning of the fitting work of the ring 8 into the recess of the elements 1, and the element 1 is composed mostly of the first elements 1a. On the other hand, the second element 1b is used only at the final phase of such fitting work, specifically, the second element 1b is used only for the last piece of the element 1 or the last several pieces of the element 1.

As also explained above, a pivotal movement of the first elements 1a connected with one another is to be restricted eventually with an increase of number of the first elements 1a holding the ring 8. Consequently, the rings 8a and 8b become difficult to be overlapped at the final phase of the fitting work. That is, the rings 8a and 8b become difficult to be fitted into the recess 7 of the first element 1a and an easiness of assembly of the driving belt V is thereby degraded. In order to solve such a problem, according to the present invention, the element 1 is composed mainly of the first elements 1a, and of the second element 1b to be used at the final phase of the fitting work of the rings 8a and 8b into the recess 7. Therefore, an easiness of assembly of the driving belt V can be improved.

Figure 5:
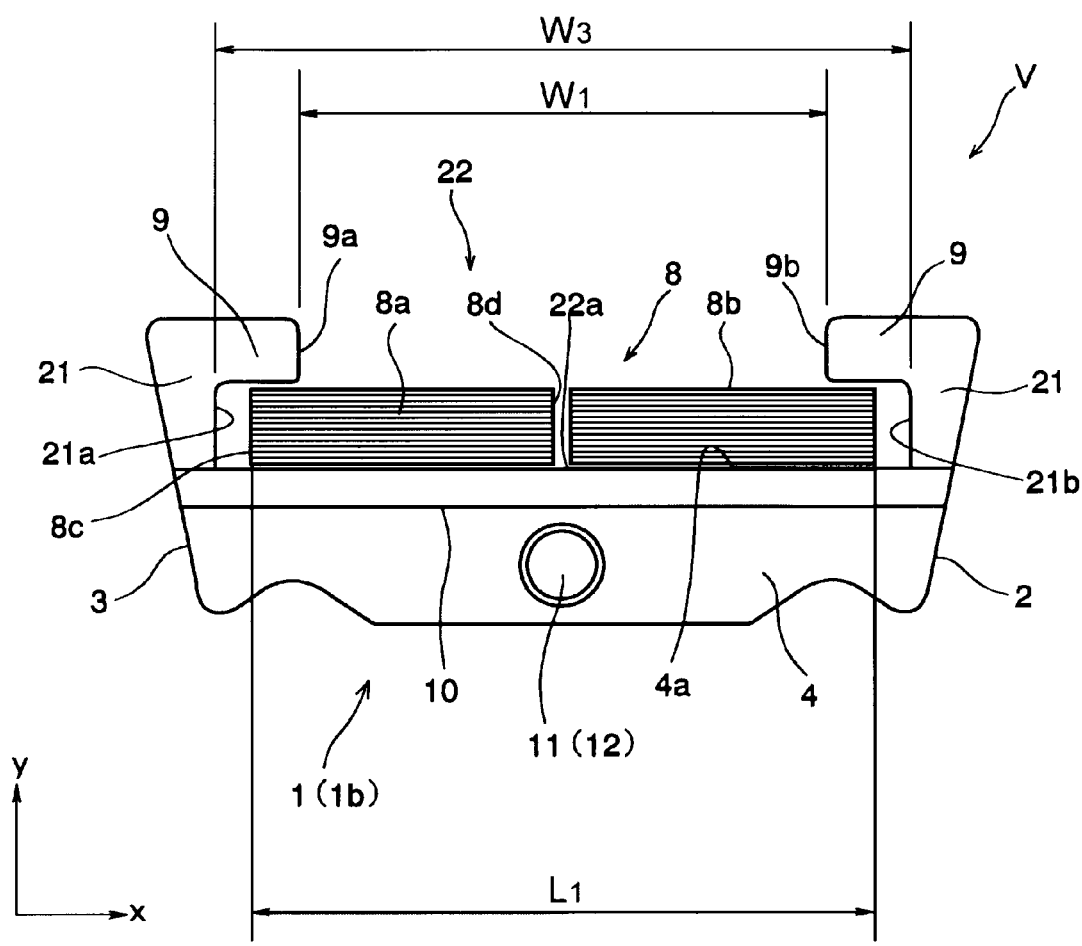
FIG. 5 is a front view schematically showing a configuration of the second element used in the first example of the driving belt of the invention.
Figure 6:
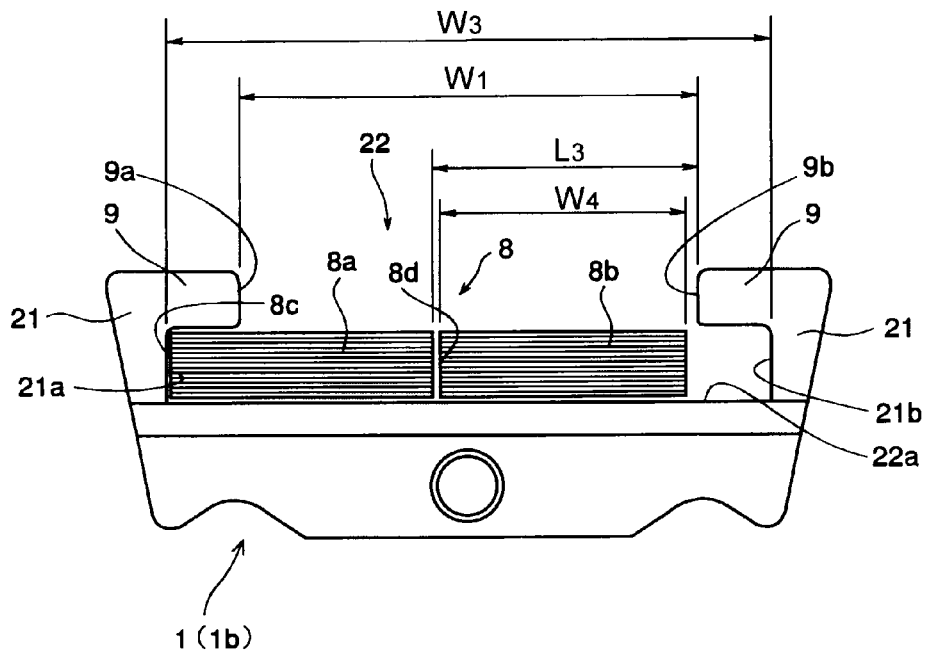
FIG. 6 is a view schematically showing a state of the first example where the outer lateral face of one of the rings is pushed onto one of the side walls of the recess of the second element.

A configuration of the second element 1b will be explained hereinafter with reference to FIGS. 2, 5 and 6. As shown in FIGS. 2, 5 and 6, only difference in the second element 1b from the first element 1a are configuration and dimensions of the recess. Therefore, further explanation of the remaining elements of the second element 1b in common with those of the first element 1a will be omitted by allotting common reference numerals.

As shown in FIG. 5, the base portion 4 comprises columns 21 erected vertically (in the direction of y-axis in FIGS. 2 and 5) at both lateral ends (in the direction of x-axis in FIG. 5) thereof. Accordingly, a recess 22 is formed by an upper face (or a top edge) 4a of the base portion 4 and both inner walls 21a and 21b of the columns 21 facing to the center of the base portion 4. Thus, the recess 22 opens upwardly, in other words, the recess 7 opens toward an outer circumference of the driving belt V.

As the recess 7 of the first element 1a, the second element 1b comprises protruding portions 9. Each protruding portion 9 is formed integrally with the column 21 and protrudes toward the width center of the base portion 4 from an outer circumferential side of the columns 21, that is, both end faces 9a and 9b of the protruding portions 9 are faced inwardly to be opposed to each other. In other words, the protruding portion 9 is formed on both opening ends of the recess 22 above lateral ends of the ring 8a and 8b, i.e., on an end portion of the inner walls 21a and 21b, and both of the protruding portions 9 protrude toward the width center of the recess 22 (i.e., in the direction of x-axis in FIG. 5). Thus, a distance between the end faces 9a and 9b being opposed to each other is an opening width of the recess 22, and such distance between the end faces 9a and 9b is represented by W1 in FIG. 5. On the other hand, a width W3 at a bottom portion 22a of the recess 22, that is, a distance between the inner walls 21a and 21b is wider than the opening width W1, as also shown in FIG. 5.

Figure 7:
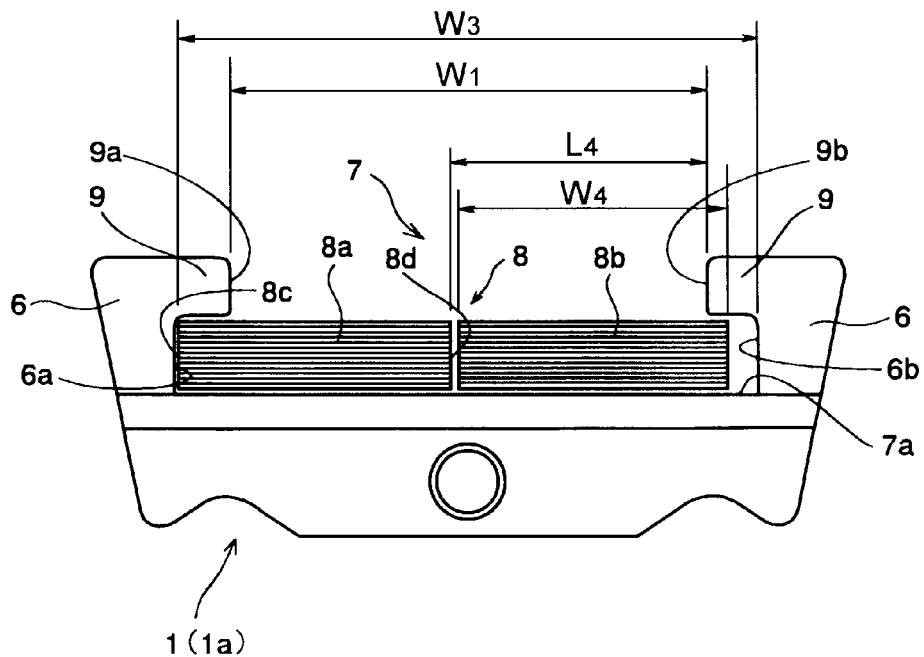
FIG. 7 is a view schematically showing a state of the first example where the outer lateral face of one of the rings is pushed onto one of the side walls of the recess of the first element.

According to the second element 1b shown in FIG. 5, the width W3 of the recess 22 is different from the width W2 of the recess 7 of the first element 1a, that is, the width W3 of the recess 22 is wider than the width W2 of the recess 7 of the first element 1a. Specifically, as shown in FIG. 6, in case of pushing an outer lateral face 8c of one of the rings 8a onto the inner wall 21a in the recess 22 of the second element 1b, a distance L3 between an inner lateral face 8d of the ring 8a and an end face 9b of the protruding portion 9 opposed to the inner lateral face 8d is wider than a width W4 of the ring 8b. To the contrary, as shown in FIG. 7, in case of pushing the outer lateral face 8c of one of the rings 8a onto the inner wall 6a in the recess 7 of the first element 1a, a distance L4 between the inner lateral face 8d of the ring 8a and the end face 9b of the protruding portion 9 opposed to the inner lateral face 8d is narrower than a width W4 of the ring 8b.

That is, a portion of the ring 8 where the rings 8a and 8b aligned parallel to each other can be fitted into the recess 22 of the second element 1b without being overlapped. Specifically, as shown in the example of FIG. 6, a sufficient space for the ring 8b aligned parallel to the ring 8a to enter into the recess 22 can be created by pushing the outer lateral face 8c of the ring 8a onto the inner wall 21a. As a result, the ring 8b can be fitted onto the bottom face 22a of the recess 22. Then, the second element 1b accommodating the rings 8a and 8b in its recess 22 is moved laterally in the direction to isolate the ring 8a from the inner wall 21a, to the portion where the width center thereof conforms to the width center of the ring 8. After that, the male and female connections 11 and 12 of the second element 1b are individually joined with the male connection 11 or female connection 12 of adjoining element. Thus, the ring 8 can be fitted into the recess 22 of the second element 1b easily.

SECOND EXAMPLE

Here will be explained a second example of the element and the ring of the driving belt with reference to FIGS. 8 to 10. According to previously described first example, the width of both rings 8a and 8b constituting the ring 8 is entirely constant. On the other hand, according to the second example, the ring 8 also comprises two rings but each ring comprises two layers of different widths. Specifically, the width of both inner rings is constant entirely, and a width of each outer ring is also constant entirely but narrower than that of the inner ring. The remaining elements of the second example are identical to those of the first example shown in FIGS. 1 to 7, so further explanation of the elements in common with those in the first Example will be omitted by allotting common reference numerals. Here, the configuration of the recess 22 of the second element 1b is illustrated by a broken line in FIGS. 8 and 10.

Figure 8:
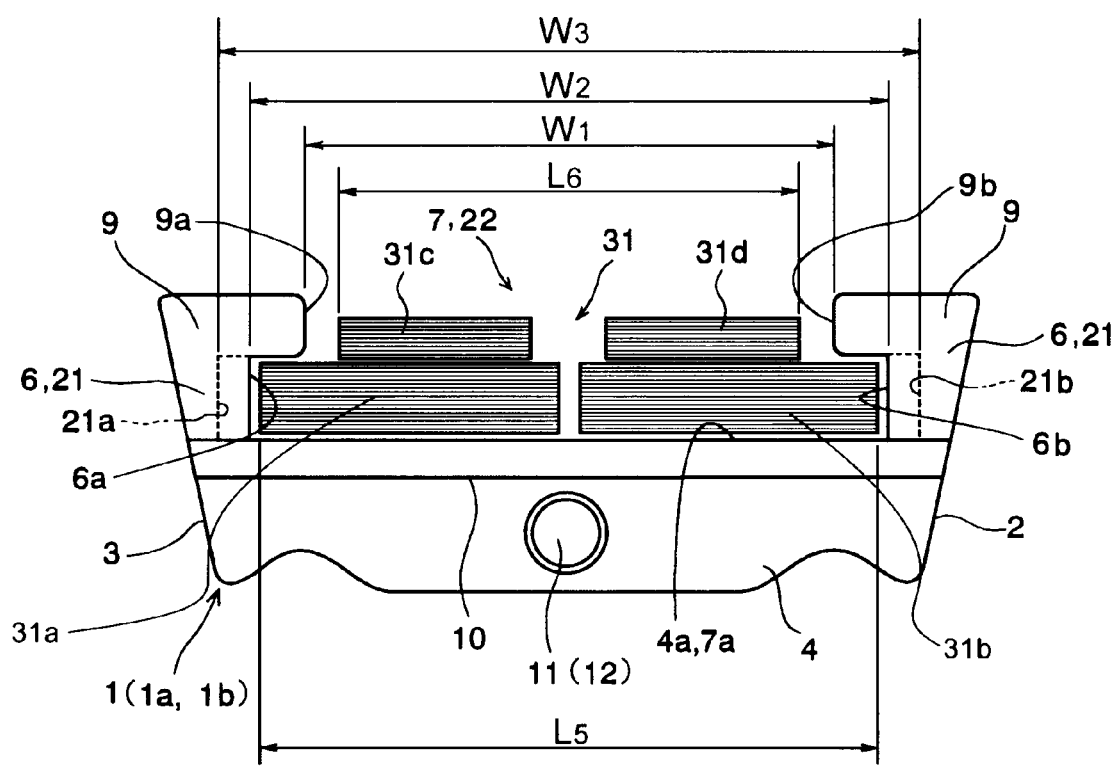
FIG. 8 is a front view schematically showing a second example of the driving belt of the invention.
Figure 9:
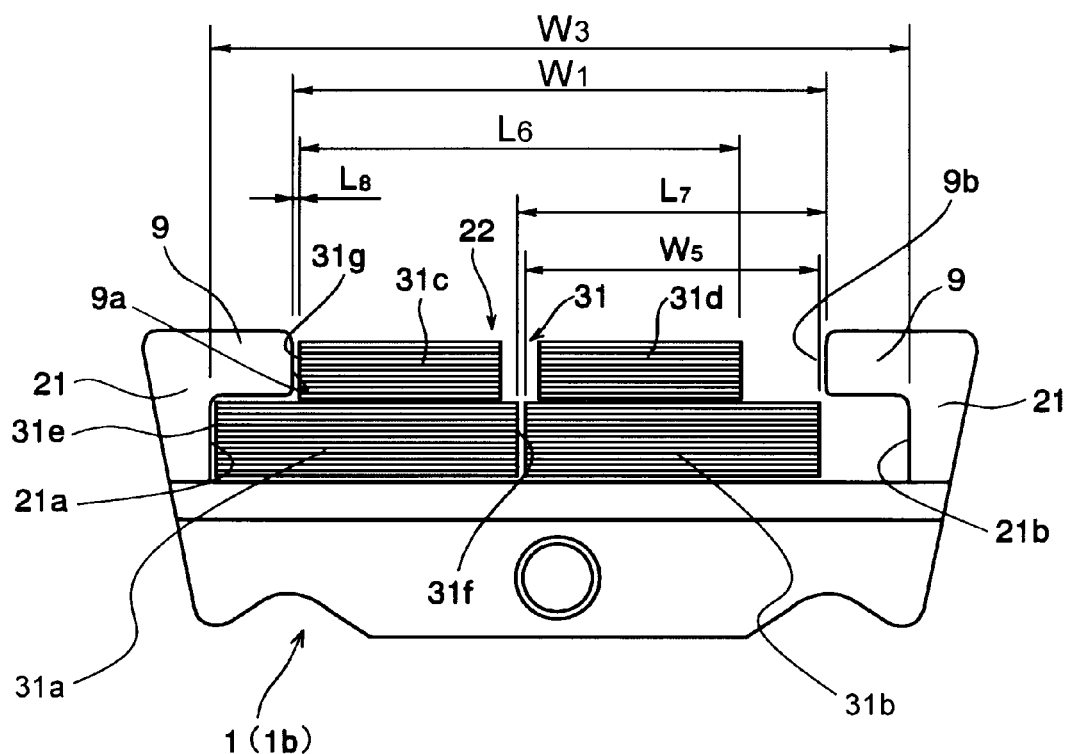
FIG. 9 is a view schematically showing a state of the second example where the outer lateral face of one of the rings is pushed onto one of the side walls of the recess of the second element.

In the example shown in FIG. 8, two lines of rings 31a and 31b are used to constitute a ring 31 instead of the rings 8a and 8b of the first example. As shown in FIG. 8, outer rings 31c and 31d are individually formed on the rings 31a and 31b, and widths of the outer rings 31c and 31d are narrower than those of the rings 31a and 31b.

Specifically, as the rings 8a and 8b of the first example, widths of the rings 31a and 31b are entirely constant, and those rings 31a and 31b are aligned parallel to each other. As described above, the outer rings 31c and 31d are individually formed on outer circumferential faces of the rings 31a and 31b, and a total width of the outer rings 31c and 31d is narrower than the opening width W1 between the end faces 9a and 9b of the protruding portions 9.

More specifically, as shown in FIG. 8, a width L5 of the ring 31, that is, a total width of rings 31a and 31b aligned parallel to each other is wider than the opening width W1 but narrower than the widths W2 and W3. Therefore, in case of pushing an outer lateral face 31e of one of the rings 31a onto an inner wall 21a of the second element 1b, a distance L7 between an inner lateral face 31f of the ring 31a and an end face 9b opposing thereto is longer than a width W5 of the ring 31b, as can be seen from an example shown in FIG. 9.

In addition to above, a width W6 between outer lateral faces of the outer rings 31c and 31d formed individually on outer circumferential faces of the rings 31a and 31b is narrower than the opening width W1. Here, in case of pushing the outer lateral face 31e of one of the rings 31a onto the inner wall 21a of the second element 1b, a distance L8 between an outer lateral face 31g of the outer ring 31c and an end face 9a opposed thereto is larger than zero, as also shown in FIG. 9.

As in the first example, the rings 31a and 31b are individually designed to have a width thereof which can make the total maximum width of the ring 31 narrower than the opening width W1 when overlapped partially.

Therefore, the ring 31 can be fitted into the recess 7 of the first element 1a from the clearance between the end faces 9a and 9b by overlapping the rings 31a and 31b partially. After the overlapped portion of the rings 31a and 31b is thus fitted into the recess 7 from the clearance between the end faces 9a and 9b, the first element 1a holding the rings 31a and 31b in the recess 7 is moved to the portion where the rings 31a and 31b are aligned parallel to each other so that the rings 31a and 31b can be accommodated in the recess 7 firmly while being aligned parallel to each other. Alternatively, it is also possible to align the partially overlapped rings 31a and 31b parallel to each other again in the recess 7. As a result, the rings 31a and 31b can be held properly in the recess 7 while being aligned parallel to each other, and detachment of the ring 31 from the first element 1a is thereby prevented. Thus, according to the invention, the ring 31 can be accommodated in the recess 7 of the first element 1a easily and certainly.

In case of fitting the ring 31 into the recess 22 of the second element 1b, for example, the ring 31a is fitted into the recess 22 together with the outer ring 31c while pushing the outer lateral face 31e of the ring 31a onto the inner wall 21a to create a sufficient space for the rings 31b and 31d aligned parallel thereto to enter into the recess 22. As a result, the rings 311) can be fitted onto the bottom face 22a of the recess 22. Then, the second element 1b accommodating the rings 31a, 31b, 31c and 31d in its recess 22 is moved laterally in the direction to isolate the ring 31a from the inner wall 21a, to the portion where the width center thereof conforms to the width center of the ring 31. After that, the male and female connections 11 and 12 of the second element 1b are individually joined with the male connection 11 or female connection 12 of the adjoining element. Thus, the ring 31 can also be fitted easily into the recess 22 of the second element 1b.

Thus, according to the second example of the invention, strength of the ring 31 can be enhanced by forming the outer rings 31c and 31d individually on the rings 31a and 31b to increase a thickness of the ring 31 within the clearance between the end faces 9a and 9b, without degrading easiness of fitting the ring 31 into the recess of the element.

For example, strength of the ring 8 of the driving belt V shown in FIG. 1 can be enhanced by forming additional outer rings 31c and 31d individually on the rings 8a and 8b utilizing the space between the end faces 9a and 9b. In addition, a torque capacity of the driving belt V can also be increased without changing the design of the element 1.

Figure 10:
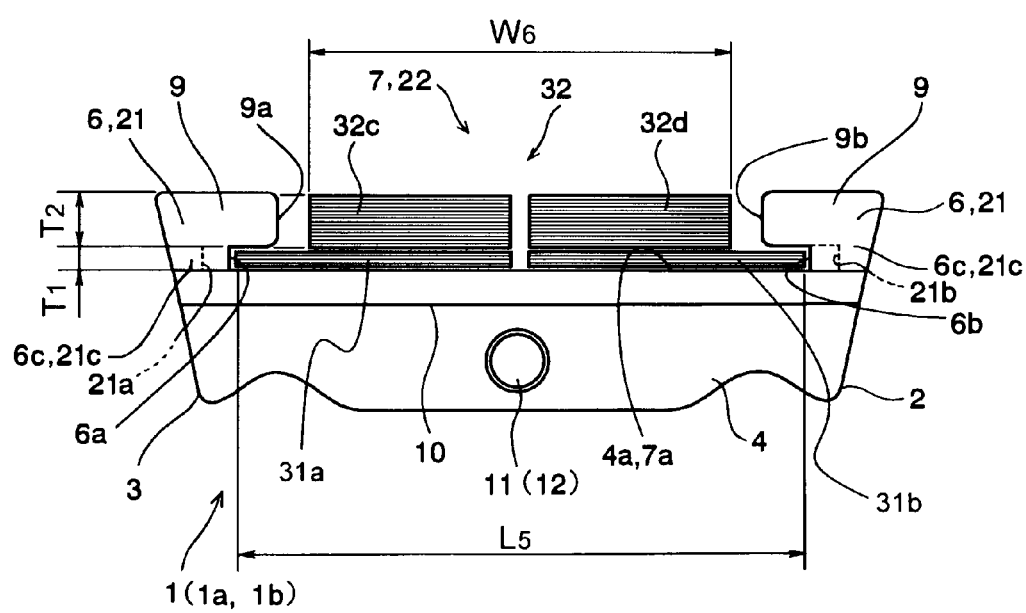
FIG. 10 is a front view schematically showing a modified example of the driving belt according to the third example.

FIG. 10 shows a modified example of the second Example. As the ring 31 shown in FIGS. 8 and 9, a ring 32 also comprises two lines of inner rings 32a and 321), and outer rings 32c and 32d narrower than the rings 32a and 32b formed individually on the rings 32a and 32b.

Specifically, widths of the rings 32a and 32b are entirely constant, and those rings 32a and 32b are aligned parallel to each other. As described above, the outer rings 32c and 32d are individually formed on outer circumferential faces of the rings 32a and 32b, and a total width of the outer rings 32c and 32d is narrower than the opening width W1, that is, narrower than the clearance between the protruding portions 9.

According to the ring 32 shown in FIG. 10, a thickness T2 of the ring 32c or 32d is thicker than a thickness T1 of the ring 32a or 32b. In other words, the thickness T1 of the ring 32a or 32b is thinned as much as possible within an allowable range not to degrade the strength and function of the ring 32. In connection with such reduced thickness of the rings 32a and 32b, a height 6c or 21c of the column 6 or 21, in other words, a height of the recess 7 or 22 of the element 1a or 1b where the rings 32a and 32b are to be accommodated is also shortened as much as possible.

Thus according to the example shown in FIG. 10, the thickness T1 of the ring 32a or 32b is thinned as much as possible, and the height 6c or 21c of the column 6 or 21 for accommodating the ring 32a and 32b is shortened as much as possible. For this reason, a weight and a moment of inertia of the element 1 can be reduced. That is, a load on the belt 32 resulting from the inertia moment of the element 1 when driving the driving belt V is lightened. As a result, durability of the ring 32, i.e., the driving belt V is improved.

EXAMPLE OF ASSEMBLY

Here will be explained a procedural example of an assembling work of the driving belt V with reference to FIGS. 1 to 6, and 11. At first, an example of fitting the ring 8 with the element 1 from an initial phase before the final phase, in other words, an example of fitting the ring 8 into the recess 7 of the first element 1a is to be explained hereinafter. First of all, predetermined portions in the length direction of the rings 8a and 8b aligned parallel to each other are overlapped. As shown in FIG. 4, when the rings 8a and 8b are overlapped partially, a remaining portion of the rings 8a and 8b are kept parallel to each other. The width L2 of the ring 8 thus narrowed by partially overlapping the rings 8a and 8b is narrower than the opening width W1 of the first element 1a. Therefore, the ring 8 can be fitted into the recess 7 of the element 1 from the overlapped portion. Alternatively, the ring 8 can also be fitted into a plurality of the recesses 7 at the same time by arranging predetermined pieces of the elements 1 in advance.

Then, the first element(s) 1a accommodating the overlapped portion of the rings 8a and 8b in its recess(es) 7 is/are moved in the length direction of the ring 8 to the portion where the rings 8a and 8b are aligned parallel to each other. As described above, the width L1 of the rings 8a and 8b aligned parallel to each other is narrower than the width W2 of the recess 7 of the first element 1a but wider than the opening width W1 of the first element 1a. Therefore, when the first element 1a accommodating the overlapped portion of the rings 8a and 8b in the recess 7 is moved to the portion where the rings 8a and 8b are aligned parallel to each other, the rings 8a and 8b are held firmly in the recess 7 by the protruding portions 9. As a result, the rings 8a and 8b are accommodated properly in the recess 7 of the first element 1a while being aligned parallel to each other.

The above-explained routine of fitting the ring 8 into the recess(es) 7, and moving the element(s) 1a to the portion where the rings 8a and 8b are aligned parallel to each other is repeated sequentially.

As described above, the rings 8a and 8b can be moved freely at an initial phase of the above-mentioned routine of fitting the ring 8 into the recess 7 of the first element 1a so that the rings 8a and 8b can be overlapped comparatively easily. However, the movements of the rings 8a and 8b are to be restricted eventually with the increase of the number of the first element 1a being interlinked through the male and female connections 11 and 12 and holding the rings 8a and 8b. That is, the rings 8a and 8b become difficult to be overlapped eventually. According to the invention, however, the rings 8a and 8b still can be twisted even at this stage by a pivotal movement of the first element 1a being interlinked with one another and accommodating the ring 8 in the recess 7, which is archived by applying an external force to the first element 1a by a predetermined method.

When the ring 8 is fitted into the recess 7 of all of scheduled pieces of the first elements, the external force to pivot the first element 1a is released so that the pivoted first element 1a is balanced again and the overlapped rings 8a and 8b are thereby returned to be parallel to each other. As a result, the rings 8a and 8b constituting the ring 8 are entirely aligned parallel to each other in the recesses 7 of the interlinked elements 1, and the fitting work of the ring 8 into the recess 7 of the first element 1a is completed.

Next, an example of fitting the ring 8 with the element 1 at the final phase, in other words, an example of fitting the ring 8 into the recess 22 of the second element 1b is to be explained hereinafter. As described above, the pivotal movement of the first element 1a is restricted at the final phase of fitting work of the ring 8 into the recess of the element. Therefore, it is difficult to overlap the rings 8a and 8b partially at the final phase. In order to solve the above-mentioned problem, according to the assembling method of the driving belt V of the invention, the second element 1b is used for the last piece or the last several pieces of the element 1 at the final phase of fitting the ring 8 into the recess of the element 1. That is, the ring 8 can be fitted into the recess of the element 1 without being overlapped partially. Thus, the ring 8 can be fitted into the recess of the element 1 easily even at the final phase of the fitting work.

Specifically, at the final phase of fitting work, rings 8a and 8b are fitted into the recess 22 of the second element 1b while being aligned parallel to each other. For example, as shown in FIG. 6, the ring 8a is fitted into the recess 22 of the second element 1b while being pushed to contact the outer lateral face 8c with the inner wall 21a of the recess 22. As a result, a clearance for inserting the ring 8b into the recess 22 is created between the inner lateral face 8d of the ring 8a and the end face 9b. Then, the ring 8b is fitted into the recess 22 from the created clearance to be aligned parallel to the ring 8a.

Then, the second element 1b accommodating the ring 8 in its recess 22 is moved laterally in the direction to isolate the ring 8a from the inner wall 21a, to the portion where the width center thereof conforms to the width center of the ring 8, as shown in FIG. 5. After that, the male and female connections 11 and 12 of the second element 1b are individually joined with the male connection 11 or female connection 12 of adjoining element. As a result, the ring 8 is held in properly in the recess 22 of the second element 1b.

Figure 11:
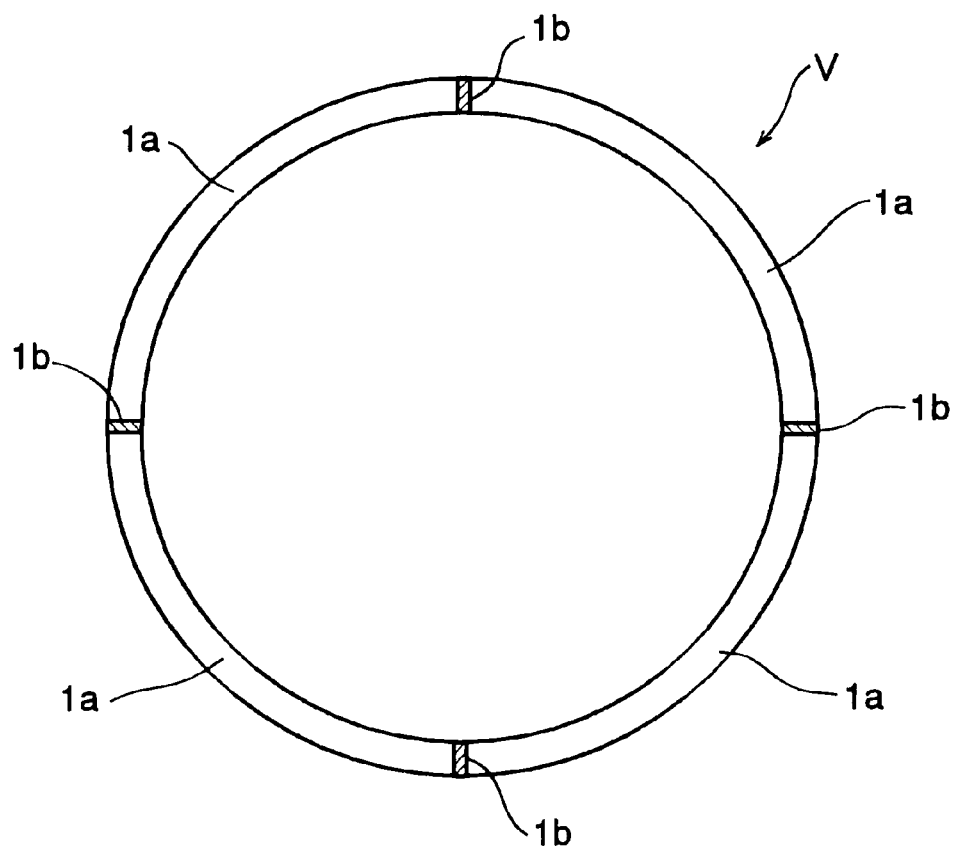
FIG. 11 is a view schematically showing points of the driving belt of the invention where the rings are fitted into the recess of the second element.

As mentioned above, a number of the second element 1b to be used at the final phase can be determined arbitrarily. That is, the number of the second element 1b to be used may be only one piece. Otherwise, it is also possible to use relatively small number of the second elements 1b, specifically, 2 to 10 pieces of the second elements 1b. Here, a number of points of the ring 8 where the second element 1b is to be used may also be determined arbitrarily. That is, the second element 1b may be used only at a predetermined single point in the entire length of the ring 8. Otherwise, it is also possible to use the second elements 1b at predetermined multiple points in the entire length of the ring 8. For example, FIG. 11 shows an example of using the second elements 1b at four points of the ring 8.

When the ring 8 is fitted into the recess(es) 22 of all of the desired number of the second element(s) 1b, the fitting work of the ring 8 into the recess of the element 1, that is, the assembling work of the driving belt V is completed.

Thus, according to the assembling method of the driving belt V of the present invention, the rings 8a and 8b aligned parallel to each other are twisted to be overlapped partially first of all when fitted into the recess 7 of the first element(s) 1a. As a result, the width L2 of the overlapped portion of the rings 8a an 8b is reduced narrower than the width L1 of the portion of the ring 8 in which the rings 8a and 8b are aligned parallel to each other. The overlapped portion of the rings 8a and 8b is then fitted into the recess(es) 7 of the first element(s) 1a, and the first element(s) 1a holding the rings 8a and 8b in the recess 7 is/are thereafter moved in the length direction of the ring 8 to the portion where the rings 8a and 8b are aligned parallel to each other. As a result, the rings 8a and 8b are accommodated in the recess(es) 7 of the first element 1a properly while being aligned parallel to each other. According to the assembling method of the invention, therefore, the ring 8 can be fitted easily into the recess 7 of the element 1.

In addition to above, according to the assembling method of the invention, the ring 8 can be fitted into the recess 7 of the first element 1a easily even at the stage in which the ring 8 is held by relatively large number of the first elements 1a interlinked through the male and female connections 11 and 12, by applying an external force to the first element 1a to pivot the first elements 1a to twist and overlap the rings 8a and 8b.

Further, at the final phase of the fitting work, the ring 8 is fitted into the recess 22 of the second element 1b while being pushed to contact e.g., the outer lateral face 8c of one of the rings 8a with the inner wall 21a of the recess 22, and then, the second element 1b accommodating the ring 8 in its recess 22 is moved laterally to the portion where the width center thereof conforms to the width center of the ring 8. Therefore, the rings 8a and 8b can be fitted easily into the recess(es) of the last piece or last several pieces of the element(s) 1, i.e., into the recess(es) 22 of the second element(s) 1b while being aligned parallel to each other without being overlapped partially. Thus, the ring 8 can be fitted into the recess of the element 1 easily even at the final phase of the fitting work, and an easiness of assembly of the driving belt V is thereby improved.

Although the example of fitting the ring 8 into the recess of the element 1 to assemble the driving belt V of the invention has been explained so far, the second example of the invention using the ring 31 or 32 can also improve an easiness of assembly of the driving belt V by using the first element 1a at the initial phase and the second element 1b at the final phase.

Here, the present invention should not be limited to the aforementioned example. That is, although the examples of the present invention thus far describe relate to the driving belt used in a belt type continuously variable transmission, the present invention can also be applied to a driving belt to be applied to another kind of transmission mechanism composed mainly of a belt and pulleys.

The invention claimed is:

1. A driving belt, comprising:
   a plurality of elements interlinked annularly to situate a recess on an outer circumferential side;
   two rows of endless rings parallel to each other in the recess of the elements, wherein
   each element of the plurality of elements pivots with respect to an adjoining element, and
   the elements include plural types of elements having different widths of the recess.

2. The driving belt as claimed in claim 1, wherein:
   the elements include a distance between an inner lateral face of one of the rings and one of end faces of an opening of the recess opposed to the inner lateral face, when an outer lateral face of said one of the rings is contacted to one of inner walls of the recess opposed to said one of the end faces of the opening of the recess, and
   the distance differs among the plural types of elements.

3. The driving belt as claimed in claim 2, wherein the plurality of elements include:
   a first element in which said distance is narrower than a width of an other of the rings; and
   a second element in which said distance is wider than the width of the other of the rings.

4. The driving belt as claimed in claim 1, wherein:
   an opening width of the recess of each element is narrower than a total width of the two rows of rings, and a width of a bottom side of the recess is wider than the total width of the two rows of rings.

5. The driving belt as claimed in claim 1, wherein:
   each element comprises a male connection protruding toward an adjoining element on one of the faces thereof being opposed to the adjoining element, and a female connection into which the male connection is fitted loosely on a face opposite to the face where the male connection is formed; and
   each of the elements is interlinked pivotally with both of the adjoining elements through the male and female connections.

6. The driving belt as claimed in claim 5, wherein:
   the male connection and the female connection are respectively formed at one spot of the face where the male connection and the female connection are respectively formed.

7. The driving belt as claimed in claim 6, wherein:
   the male and female connections are respectively formed on a width center of the face where the male and female connections are respectively formed.

8. The driving belt as claimed in claim 1, wherein:
   each element comprises protruding portions for holding the rings to prevent detachment of the rings, which protrude toward a width center of the element from an outer circumferential side of inner walls of the recess; and
   a clearance between end faces of the protruding portions is narrower than the total width of the two rows of rings.

9. The driving belt as claimed in claim 8, wherein:
   the two rows of rings comprise an outer layer, which is laid on an outer face thereof in the recess, and which is disposed between the protruding portions.

10. An assembling method of a driving belt, in which a plurality of elements is interlinked annularly in a manner to situate a recess thereof to open to an outer circumferential side, in a manner to pivot with respect to adjoining elements, in which two rows of endless rings are accommodated parallel to each other in the recess of the elements, and in which the plurality of elements include a first element and a second each element having different configurations of the recesses, comprising:

fitting the two rows of the rings into the recess of the first element except for a last piece or a last predetermined pieces of the scheduled quantity of the elements; and thereafter fitting a remaining portion of the two rows of the rings into the recess of the second element for the last piece or the last predetermined pieces of the element.

11. The assembling method of a driving belt as claimed in claim 10, comprising:

fitting the remaining portion of the two rows of rings into the recess of the second element while pushing an outer lateral face of one of the rings onto one of inner walls of the recess; and thereafter moving the second element in a width direction thereof to a predetermined portion to hold the two rows of rings.

12. The assembling method of a driving belt as claimed in claim 10, further comprising:

twisting the two rows of rings to overlap the rings partially while keeping remaining portion of the rings parallel to each other;

fitting the overlapped portion of the two rows of rings into the recess of the first element; and thereafter moving the first element to a portion where the rings are kept parallel to each other to accommodate the rings aligned parallel to each other in the recess.

13. The assembling method of a driving belt as claimed in claim 12, wherein:

a width of the overlapped portion of the two rows of the rings is narrower than an opening width of the recess; and a total width of the remaining portion of the rings aligned parallel to each other is kept wider than the opening width of the recess of the first element but narrower than a bottom width of the recess of the first element.

14. The assembling method of a driving belt as claimed in claim 10, wherein:

the two rows of rings aligned parallel to each other are overlapped partially by a pivotal movement of the first element accommodating the rings in its recess with respect to the adjoining elements.

15. A driving belt, in which a plurality of elements is interlinked annularly in a manner to situate a recess thereof to open to an outer circumferential side, in a manner to pivot with respect to adjoining elements, and in which two rows of endless rings are accommodated parallel to each other in the recess of the elements, wherein:

the elements include plural types of elements having different configurations of the recess, in which a distance between an inner lateral face of one of the rings and one of end faces of an opening of the recess opposed thereto is different, when an outer lateral face of said one of the rings is contacted to one of inner walls of the recess opposed to said one of the end faces of the opening of the recess.

16. The driving belt as claimed in claim 15, wherein the elements include:

a first element in which said distance is narrower than a width of an other ring; and a second element in which said distance is wider than the width of the other ring.

17. The driving belt as claimed in claim 15, wherein:

the elements comprise a male connection protruding toward an adjoining element on one of the faces thereof being opposed to the adjoining element, and a female connection into which the male connection is fitted loosely on a face opposite to the face where the male connection is formed; and each of the elements is interlinked pivotally with both of the adjoining elements through the male and female connections.

18. The driving belt as claimed in claim 17, wherein:

the male connection and the female connection are respectively formed at one spot of the face where the male connection and the female connection are respectively formed.

19. The driving belt as claimed in claim 18, wherein:

the male and female connections are respectively formed on a width center of the face where the male and female connections are respectively formed.

20. The driving belt as claimed in claim 15, wherein:

each element comprises protruding portions for holding the rings to prevent detachment of the rings, which protrude toward a width center of the element from outer circumferential side of inner walls of the recess; and a clearance between end faces of the protruding portions is narrower than the total width of the two rows of rings.

\* \* \* \* \*